UNITED STATES PATENT OFFICE 2,540,439

OXIDIZED PHTHALATED CASTOR OIL AND METHOD OF MANUFACTURE

Fritz E. Fuchs, Houston, Tex., assignor to Aquanox Corporation, Houston, Tex., a corporation of Texas No Drawing. Application May 7, 1949, Serial No. 92,084

4 Claims. (Cl. 260—404.8)

This invention relates to a new composition of matter and the method of manufacturing the same.

The object of this invention is to provide a new material, composition of matter, or chemical compound, consisting of the oxidation product obtained by oxidizing, as by air blowing, the product derived from the reaction between castor oil and phthalic anhydride or phthalic acid, which oxidation product is particularly adapted for use as a treating or demulsifying agent in the resolution of petroleum emulsions of the water-in-oil type.

Condensation products of polybasic acids, polyhydric alcohols, and various fatty acids and oils comprise a general class of so-called "oil modified" alkyd resins which are well-known materials of commerce. However, the present invention is directed to products obtained by oxidation treatment of a particular sub-species of this general class, namely, the products obtained by the direct reaction of raw or unoxidized castor oil with phthalic acid, preferably in the form of its anhydride. I have found that when this particular reaction product is subjected to oxidation, as by blowing with air, oxidized products are obtained which are especially effective demulsifying agents for the resolution of petroleum emulsions, particularly of the water-in-oil type.

I am aware that petroleum demulsifying agents have heretofore been made by reacting blown castor oil, as such, with various polybasic acids, and also by reacting polybasic acids with mixtures of castor oil and drying or semi-drying oils in those forms which contain polyhydric alcohol residues having unreacted hydroxyls in these residues, and thereafter blowing these intermediates. The latter types of demulsifying agents are described particularly in De Groote Patent No. 2,104,793, January 11, 1938, which, in every instance, requires the presence in the final product of both an oxygen-convertible fatty acid residue and a polybasic acid residue and in addition, either a polyhydric alcohol residue or a non-oxygen-convertible fatty acid residue, or both. The so-called oxygen-convertible fatty acid residues are typified by fatty materials such as linseed oil, perilla oil, tungoil, sunflower seed oil and the like, while the so-called non-oxygen-convertible fatty acid residues may include the fatty acids of castor oil, corn oil, cocoanut oil and the like.

In no previous instance, however, of which I am aware, has it been proposed to produce a demulsifying agent by, first, the direct reaction of raw castor oil with phthalic anhydride (acid); and second, by the oxidation of this particular product.

I have found that when the condensation product of castor oil and phthalic anhydride (acid) is subjected to blowing with air or other suitable oxygen-containing gas, the resulting oxidized products form exceptionally efficient demulsifying agents, particularly for effecting the separation or resolution of petroleum emulsions of the usual water-in-oil type. In particular, I have found that such products are much superior to products in which blown castor oil is used as the starting material. These oxidized products may be employed, as such, for the treatment of emulsions or may be mixed with other well-known ingredients useful for breaking petroleum emulsions.

Castor oil is the tri-glyceride of ricinoleic acid, each of the ricinoleic acid chains being linked through its carboxylic group to one of the hydroxyls of the glycerol radicle. Each of these ricinoleic acid chains also has a hydroxyl group and a double-bond linkage in the chain. In the preparation of reagents in accordance with this invention, the castor oil will be reacted with phthalic anhydride (acid) under conditions which will produce primarily an esterification reaction between the hydroxy group on the fatty acid chain and carboxyls of the acid. The molal proportions of the reactants and the reaction conditions will be selected so as to leave substantially no free hydroxyls or free carboxyls in the final product.

When any such products are then subjected to oxidation, as by air blowing, the resulting products are found to be excellent demulsifying agents. The extent of the oxidation reaction may be determined and regulated in any suitable manner, as by a reduction in iodine value, or by an increase in viscosity. The latter will ordinarily be employed as a measure of the extent of the oxidation reaction so as to provide a final product having the desired characteristics.

The final products may be used as such for the treatment of petroleum emulsions, but will ordinarily be diluted with any suitable solvent, such as the various petroleum naptha thinners, kerosene; aromatic napthas and solvents such as benzene, toluene, xylene; alcohols, particularly the aliphatic alcohols such as methyl, ethyl, propyl and the like.

The final products may also be mixed with other types of demulsifying agents, such as the modified fatty acid type, petroleum sulfonate type, and with various other demulsifying agents, in particular, the so-called "Tweens" which may be characterized as polyoxyalkylene derivatives of hexahydric bodies which have been partially esterified with long chain fatty acids. The latter are more fully described in my co-pending application Serial No. 785,549, filed November 12, 1947, now Patent No. 2,492,473.

Any free acidity in the oxidized products may be neutralized in the usual manner with any of the conventional basic neutralizing agents, such as ammonia, alkalis, the basic amines, etc.

The following is an example of the method of preparing my preferred reagent:

78.5 pounds of ordinary commercial grade No. 3 castor oil is placed in a conventional heated reaction vessel, fitted with a stirrer and inlet nozzles for the introduction of air, and heated to a temperature of 160° C. 21.5 pounds of phthalic anhydride, or an equivalent weight of phthalic acid, is mixed with castor oil and the temperature of the mixture gradually raised to 205° C. about two hours being employed to bring the mixture up to this temperature. The weights mentioned correspond to the approximate molal proportions of two mols of castor oil to three mols of phthalic anhydride or acid to provide the proper number of carboxyl radicles in the phthalic anhydride to react with all of the free hydroxyls of the triricinolein. Ordinarily a slight excess of phthalic anhydride will be employed to assure that the esterification reaction will go to completion.

The mixture is maintained at 205° C. for about one hour, after which the temperature is reduced to about 177° C. and the reaction allowed to proceed for six hours at the latter temperature. When the reaction is complete as will be indicated by the disappearance of free hydroxyls and substantial disappearance of phthalic acid acidity, the temperture of the product is reduced to about 250° F. and a current of air is blown through the mixture. Air blowing is continued at this temperature for about 22½ hours, at the end of which period, the viscosity of the phthalated castor oil will be found to have increased from an original value of about 75 seconds at 210° F. to about 195 seconds at 210° F. (both measurements by the Saybolt Furol method). The air blowing is preferably, though not necessarily, conducted at atmospheric pressure.

It will be understood that either atmospheric air, or oxygen or oxygen-enriched air may be employed for oxidation of the phthalated castor oil.

If desired, any free acidity remaining in the final product may be neutralized with conventional neutralizing agents, as mentioned above. The product, with or without neutralization, may be used as such in the treatment of petroleum emulsions but will ordinarily be diluted with one or more of the above-mentioned thinners to a consistency which is more convenient for handling and for application to the emulsions to be treated. Also, as noted, the product may be mixed with one or more of the other above-mentioned demulsifying agents.

In general the condensation products of castor oil and phthalic anhydride (acid) will be oxidized in the manner described, to final viscosities ranging from about 150 seconds at 210° F. to about 250 seconds at 210° F. Stated otherwise, the phthalated castor oil will be blown to a viscosity increase of from about 100% to about 400% above its initial viscosity which will ordinarily range from about 70 to 80 seconds at 210° F. (Furol Method).

What I claim and desire to secure by Letters Patent is:

1. A composition of matter consisting essentially of the oxidation product derived by the oxidation with an oxygen-containing gas of the esterification product produced by the reaction of unoxidized castor oil with a member of the group consisting of phthalic acid and its anhydride said product having substantially no free carboxyls or free hydroxyls.

2. A composition of matter consisting essentially of the oxidation product derived by the oxidation with an oxygen-containing gas of the esterification product produced by the reaction of unoxidized castor oil with a member of the group consisting of phthalic acid and its anhydride in the approximate proportions of two mols of the castor oil to three mols of the phthalic acid or anhydride said product having substantially no free carboxyls or free hydroxyls.

3. A composition of matter consisting essentially of the oxidation product derived by the oxidation with an oxygen-containing gas of the esterification product produced by the reaction of unoxidized castor oil with a member of the group consisting phthalic acid and its anhydride in the approximate proportions of two mols of the castor oil to three mols of the phthalic acid or its anhydride said product having substantially no free carboxyls or free hydroxyls, the degree of said oxidation being such as to produce an increase in viscosity of said esterification product to from about 100 to 400% of its initial viscosity.

4. The method of manufacturing a blown phthalated castor oil product which comprises reacting unoxidized castor oil with a member of the group consisting of phthalic acid and its anhydride in the proportions of two mols of said castor oil to three mols of said phthalic acid or its anhydride under conditions to produce an esterification product having substantially no free hydroxyls or carboxyls, and thereafter blowing said esterification product with an oxygen-containing gas until the initial viscosity of said esterification product has increased to from about 100 to 400% of its initial viscosity.

FRITZ E. FUCHS.

REFERENCES CITED

The following references are of record in the file of this patent:

UNITED STATES PATENTS

| Number | Name | Date |
|---|---|---|
| 1,976,602 | De Groote | Oct. 9, 1934 |